(12) United States Patent
Murase et al.

(10) Patent No.: US 7,125,191 B2
(45) Date of Patent: Oct. 24, 2006

(54) POWER TRANSMISSION DEVICE

(75) Inventors: Masakazu Murase, Aichi (JP);
Fuminobu Enokijima, Aichi (JP);
Naoya Yokomachi, Aichi (JP); Tatsuya Koide, Aichi (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/200,926

(22) Filed: Jul. 22, 2002

(65) Prior Publication Data
US 2003/0017909 A1    Jan. 23, 2003

(30) Foreign Application Priority Data
Jul. 23, 2001    (JP) .................... P 2001-221510

(51) Int. Cl.
*E01F 9/18*    (2006.01)
(52) U.S. Cl. .............................. 403/1; 403/2
(58) Field of Classification Search ............ 403/1, 403/2; 464/30, 32; 474/70, 168, 170–171, 474/181–182, 902–903, 199; D8/360
See application file for complete search history.

(56) References Cited

U.S. PATENT DOCUMENTS

| 2,917,935 | A | * | 12/1959 | Haug | .................. 403/245 |
| 4,011,019 | A | | 3/1977 | McDonald et al. | |
| 4,129,026 | A | * | 12/1978 | Pierce et al. | |
| 5,443,372 | A | * | 8/1995 | Kanoll | .................. 464/32 |
| 6,332,842 | B1 | * | 12/2001 | Tabuchi et al. | .............. 464/32 |

FOREIGN PATENT DOCUMENTS

| EP | 801 237 A1 | 10/1997 |
| JP | 62-24161 | 2/1987 |
| JP | 2-67152 | 5/1990 |

* cited by examiner

*Primary Examiner*—Daniel P. Stodola
*Assistant Examiner*—Victor MacArthur
(74) *Attorney, Agent, or Firm*—Morgan & Finnegan, LLP

(57) ABSTRACT

A torque limiter to be operatively coupled to an engine is secured to the outer periphery of a driving shaft through screwing-engagement. The driving shaft and the torque limiter are screw-engaged and fixed to each other so that the torque limiter is pushed or urged against a seating face formed at the outer periphery of the driving shaft. The seating face abuts against the torque limiter restricting the screwing-movement of the driving shaft. Rotation force is transmitted between the driving shaft and the torque limiter via the seating face. A cylindrical member is disposed between the torque limiter and the seating face of the driving shaft. The cylindrical member is press-fitted and fixed to the outer periphery of the driving shaft, so that the power transmission between the driving shaft and the torque limiter is also performed through the press-fit portion between the cylindrical member and the driving shaft.

11 Claims, 3 Drawing Sheets

POWER TRANSMISSION DEVICE

BACKGROUND OF THE INVENTION

1. Field of the Invention

This invention relates to a power transmission device constituting a power transmission path.

2. Background Art

As an example of such a kind of power transmission device, there is one as shown in FIG. 6. Such an example has a shaft 101 and a rotation body 102, both constituting a power transmission path. A thread surface 101a is formed at the outer peripheral surface of the tip end of the shaft 101. The rotation body 102 has a cylindrical portion 103 to be fitted on the outer surface of the shaft 101. A thread surface 103a to be engaged with the thread surface 101a of the shaft 101 is formed on the inner peripheral surface of the cylindrical portion 103. A seating face 101b is provided at the position adjacent to the thread surface 101a of the outer peripheral surface of the shaft 101 so that the rotation body 102 abuts against the seating face 101b thereby to restrict the screwing movement of the shaft 101 in an axial direction shown by L.

Thus, due to the screwing engagement of the shaft 101 with the rotation body 102, the rotation body 102 is pushed at the abutment surface 103b thereof as the tip end surface of the cylindrical portion 103 against the seating face 101b of the shaft 101, whereby the shaft 101 and the rotation body 102 are fastened and fixed to each other so as to be able to transmit power therebetween. That is, the seating face 101b of the shaft 101 and the abutment surface 103b of the rotation body 102 serve as power transmission surfaces between the shaft 101 and the rotation body 102.

However, in order to perform the fastening and fixing operation surely between the shaft 101 and the rotation body 102, in other words, to surely transmit power between the shaft 101 and the rotation body 102, it is required to secure a wide contact area between the seating face 101b and the abutment surface 103b. However, each of the seating face 101b and the abutment surface 103b, is formed by a surface perpendicular to the shaft line L of the shaft 101. Thus, particularly, the widening of the seating face 101b directly results in the enlargement of the diameter of the shaft 101.

When the shaft 101 is the driving shaft of a fluid-machine, the diameter of the driving shaft 101 greatly influences on various kinds of members operatively coupled to the driving shaft and so on a housing for containing the various kinds of members. Accordingly, the enlargement of the diameter of the driving shaft 101 results in the enlargement of the axial size of the fluid machine.

SUMMARY OF THE INVENTION

Accordingly, an object of the invention is to provide a power transmission device which can surely fasten and fix a shaft and a rotation body to each other without enlarging the diameter of the shaft.

A power transmission device according to a first aspect of the invention comprises a shaft capable of rotating around an axis; and a rotation body pressed on and fixed to the shaft in a direction parallel to the axis of the shaft to rotate along with the shaft; wherein the shaft and the rotation body are in mutual contact and exerting a press-fit force, F on each other in a direction perpendicular to the axis of the shaft.

According to a second aspect of the invention, one of the rotation body and shaft is press-fitted and fixed to the other in a direction parallel to the axis of the shaft as to exert a press-fit force, F on the other in a direction perpendicular to the axis of the shaft.

According to these aspects of the invention, the power transmission between the shaft and the rotation body is shared by a seating face to which the rotation body is pushed or urged and the portion in which the rotation body is pressed in and engaged with. Thus, an amount of the transmission torque to be born by the seating face can be reduced. Therefore, it becomes possible to surely perform the power transmission between the shaft and the rotation body without increasing the area of the seating face. The reduction of the area of the seating face results in the reduction of the diameter of the shaft.

According to a third aspect of the invention, the rotation body comprises a main body and a cylindrical member, both abutting on each other at their end surfaces; and the cylindrical member is press-fitted and fixed to the outer periphery of the shaft.

According to this aspect of the invention, the cylindrical member to be pressed in and fixed to the shaft is provided separately from the rotation body to be engaged with the shaft. Thus, the press-fit procedure of the cylindrical member to the shaft and the screwing-engagement procedure of the rotation body with the shaft can be performed separately and so the assembling procedure of each of the cylindrical member and the rotation body with respect to the shaft can be performed easily.

According to a fourth aspect of the invention, the main body is pressed to the shaft in a direction parallel to the axis of the shaft via the cylindrical member to fix the main body to the cylindrical member.

According to this aspect of the invention, the assembling procedure of the cylindrical member with the shaft can be performed by such a simple procedure of merely pushing the cylindrical member in the shaft to such a position that the cylindrical member abuts against the seating face. Therefore, it is possible to eliminate such a troublesome procedure of adjusting the position of the cylindrical member in the shaft.

According to a fifth aspect of the invention, the cylindrical member has a higher intensity than the main body.

According to a sixth aspect of the invention, a part of the rotation body breaks when more than a predetermined amount of torque is acted.

According to this aspect of the invention, when the transmission torque between the shaft and the rotation body becomes excessive, a part of the rotation body is broken due to the excessive transmission torque and so the power transmission is cut off.

According to a seventh aspect of the invention, the shaft has a seating face; the rotation body is pressed on the seating face in a direction parallel to the axis of the shaft; the shaft has a thread surface and a press-fit surface on its outer periphery, the thread surface to be screw-engaged with the rotation body, the press-fit surface exerting a press-fit force, F on the rotation body and being press-fitted to the shaft; the press-fit surface is larger in a diameter than the thread surface; and the seating face is disposed between the press-fit surface and the thread surface.

According to an eighth aspect of the invention, the seating face is formed in a tapered shape so that a diameter thereof is reduced toward the thread surface.

According to this aspect of the invention, the cylindrical member or the cylindrical portion of the rotation body can be press-fitted to and engaged with the shaft smoothly due to the guide function of the taper-shaped seating face.

A power transmission device according to a ninth aspect of the invention further comprises a driving source for providing with the rotation force.

A power transmission device according to a tenth aspect of the invention comprises a shaft; and a rotation body fixed to the shaft to transmit rotation force of the shaft wherein the shaft has a seating face; and the rotation body is pushed against the seating face and press-fitted to the shaft to be fixed thereto.

According to an eleventh aspect of the invention, the shaft and the rotation body are screwed each other; and the seating face restricts screwing movement of the shaft and the rotation body.

According to a twelfth aspect of the invention, the rotation body comprises a cylindrical portion; and the cylindrical portion is press-fitted to the outer periphery of the shaft.

According to a thirteenth aspect of the invention, a thread surface and a press-fit surface are formed on an inner peripheral surface of the cylindrical portion; the thread surface is engaged with the shaft; and the cylindrical portion is press-fitted to the shaft to be in contact with the shaft via the press-fit surface.

According to this aspect of the invention, as compared with a case where a cylindrical portion for the thread surface and a cylindrical portion for the press-fit surface are provided separately, the configuration of the rotation body can be made simple and so the rotation body can be manufactured easily.

DETAILED DESCRIPTION OF THE PREFERRED EMBODIMENTS

Hereinafter, the explanation will be made as to first and second embodiments of the invention in which the invention is materialized to a power transmission path between an engine as an external driving source and a compressor as a fluid machine in an air conditioning apparatus for a vehicle. In the second embodiment, the explanation will be made as to only portions different from the first embodiment and members corresponding to those of the first embodiment are referred to by the common symbols, with explanation thereof being omitted.

The First Preferred Embodiment (Power Transmission Path)

Figure 1:
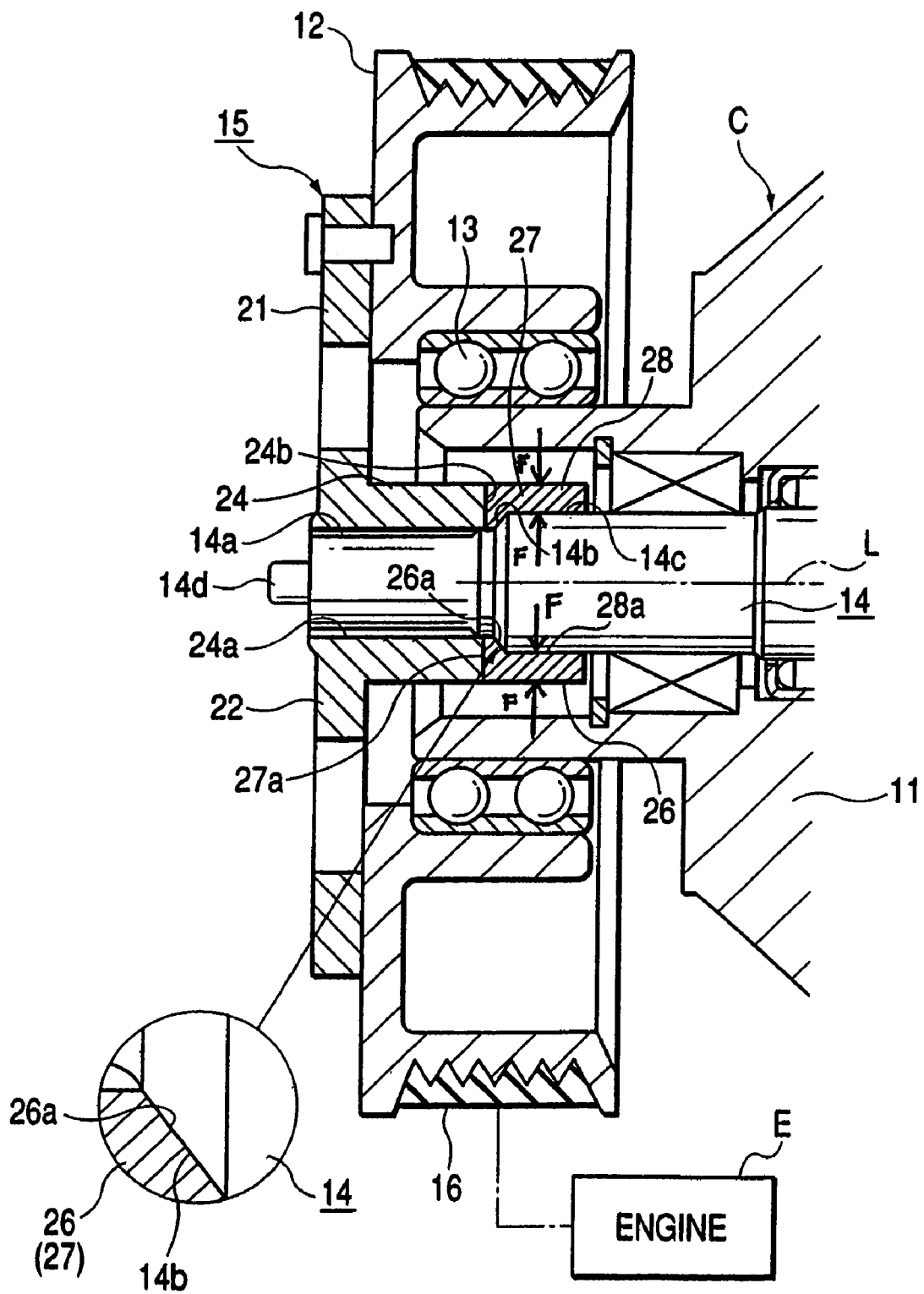
FIG. 1 is an enlarged sectional view showing a main portion of a compressor provided with a torque limiter.

As shown in FIG. 1, a rotor 12 is supported through a bearing 13 so as to be rotatable by the housing 11 of a compressor C constituting a refrigerating cycle. The rotor 12 is operatively coupled through a torque limiter 15 serving as a rotation body to a driving shaft 14 serving as a shaft coupled to the compression mechanism (not shown) of the compressor C. A belt 16 coupled to the output shaft of an engine E serving as a running driving source for a vehicle is wound around the rotor 12.

Thus, the power (rotation force) of the engine E is transmitted to the driving shaft 14 through the belt 16, the rotor 12 and the torque limiter 15, whereby refrigerant gas is compressed by the compression mechanism. Although a piston-type, a scroll-type etc. are raised as the compression mechanism, the compression mechanism of any construction can be applied to the invention The torque limiter 15 is configured so as to be able to cut off the transmission of an excessive torque from the engine E to the compressor C. A broken type of the torque limiter in which a part of the power transmission path is broken due to the action of the excessive torque is employed as the torque limiter 15.

(Construction of the Torque Limiter)

Figure 2:
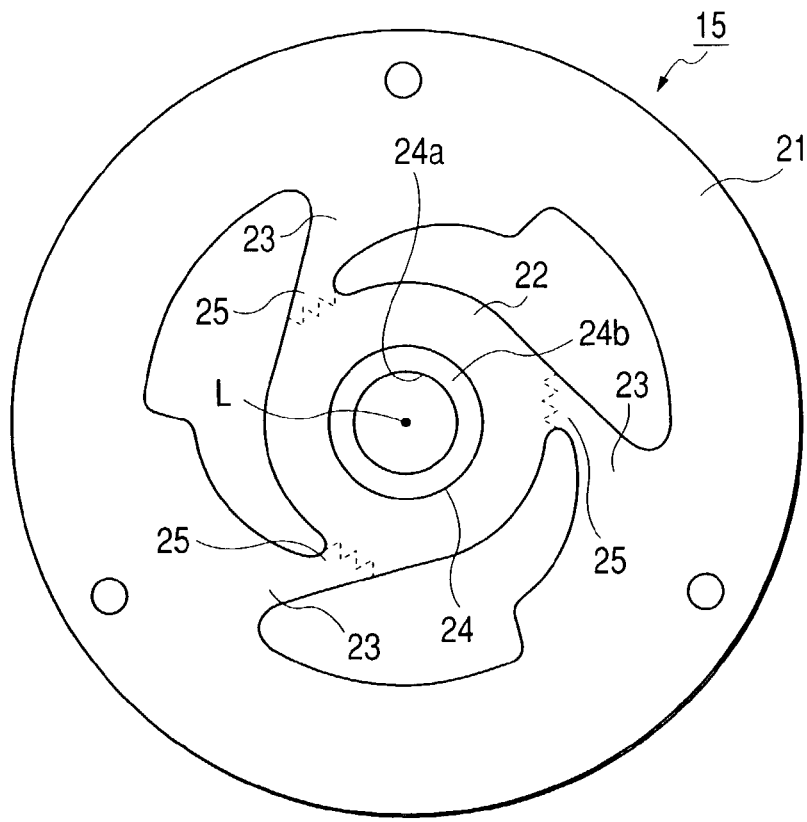
FIG. 2 is a front view showing the torque limiter taken out from the compressor.

As shown in FIGS. 1 and 2, the torque limiter 15 consists of a main body formed by an outer peripheral portion 21, an inner peripheral portion 22 disposed at the inside of the outer peripheral portion 21, coupling portions 23 coupling the outer peripheral portion 21 and the inner peripheral portion 22 so as to bridge them, and a cylindrical portion 24. The cylindrical portion 24 is protrusively provided at the center position of the inner peripheral portion 22. The torque limiter 15 is made of sintered metal such as JIS (Japanese Industrial Standard), 12EPC etc. and configured by integrally forming the outer peripheral portion 21, the inner peripheral portion 22, the coupling portions 23 and the cylindrical portion 24.

The torque limiter 15 is fastened and fixed to the driving shaft 14 so as to be rotatable integrally therewith by means of the cylindrical portion 24. The torque limiter 15 is operatively coupled to the rotor 12 by means of the outer peripheral portion 21. Thus, the power from the engine E is transmitted to the outer peripheral portion 21 through the rotor 12 and also transmitted to the cylindrical portion 24 through the coupling portions 23 and the inner peripheral portion 22 from the outer peripheral portion 21 to rotate the driving shaft 14. The power transmission is performed by rotating the torque limiter 15 clockwise in FIG. 2.

Plural coupling portions (three in this embodiment) 23 are provided with the same interval around the axial line L of the driving shaft 14. Each of the coupling portions 23 is slanted on the clockwise side in FIG. 2 toward the outer peripheral portion 21 from the inner peripheral portion 22.

Thus, at the time of power transmission, tensile stress acts on the coupling portions 23 between the outer peripheral portion 21 and the inner peripheral portion 22 by the torque limiter 15 rotating clockwise.

Each of the coupling portions 23 is configured to be thinner in its width gradually toward the inner peripheral portion 22 from the outer peripheral portion 21. A broken portion 25 is provided around a boundary between the inner peripheral portion 22 and each of the coupling portions 23.

(Action of the Torque Limiter)

When the transmission torque to the driving shaft 14 from the engine E becomes excessive due to the occurrence of the dead lock at the compression mechanism of the compressor C, for example, the tensile stress acting on the coupling portions 23 of the torque limiter 15 between the outer peripheral portion 21 and the inner peripheral portion 22 becomes also excessive. Thus, as shown by saw-tooth dashed lines in FIG. 2, the portions are broken when an excessive stress is concentrated on the coupling portions 23.

When each of the broken portions 25 is broken, the torque limiter 15 is divided in two pieces, that is a piece on the outer peripheral portion 21 side and a portion on the inner peripheral portion 22 side. Thus, the rotor 12 is made capable of rotating relative to the driving shaft 14, so that the transmission of an excessive torque is cut off. Accordingly, an excessive increase of the driving load of the compressor due to the engine E, that is, the occurrence of an engine stall can be prevented.

(Fastening Structure Between the Driving Shaft and the Torque Limiter)

As shown in FIG. 1, a thread surface 14a is formed in a spiral manner around the axis line L on the outer peripheral surface of the tip end (the left end in the figure) in the driving shaft 14. A thread surface 24a is formed in a spiral manner around the axis line L on the inner peripheral surface of the cylindrical portion 24 in the torque limiter 15. The torque limiter 15 is fitted on the outer peripheral surface of the tip end of the driving shaft 14 by means of the cylindrical portion 24, and the driving shaft 14 and the torque limiter 15 are engaged to each other through the thread surfaces 14a, 24a.

A press-fit surface 14c having a diameter larger than that of the thread surface 14a is provided at the position adjacent to the thread surface 14a on the right side in the figure at the outer peripheral surface of the driving shaft 14. A flange or a seating face 14b is formed by the wall surface of a step portion positioned at a boundary between the thread surface 14a and the press-fit surface 14c at the outer peripheral surface of the driving shaft 14. The seating face 14b is configured in a tapered shape in a manner that the diameter thereof becomes smaller toward the thread surface 14a side. The seating face 14b restricts the screwing-movement of the driving shaft 14 in the direction along the axis line L.

A tubular cylindrical member 26 which is provided separately from the torque limiter 15 is employed in order to fasten and fix the driving shaft 14 and the torque limiter 15 to each other. The cylindrical member 26 is formed by material with a higher intensity than the material constituting the torque limiter 15, for example, SCM435, SCM415 or SUJ2 defined in the JIS.

The cylindrical member 26 is configured by a spacer portion 27 which is disposed between the seating face 14b of the driving shaft 14 and the cylindrical portion 24 of the torque limiter 15 and a press-fit portion 28 whose inner peripheral surface (press-fit surface) 28a has a diameter larger than that of the spacer portion 27. The spacer portion 27 and the press-fit portion 28 are coupled continuously in the direction along the axis line L. Each of the end surface 27a of the spacer portion 27 and the end surface 24b of the cylindrical portion 24 abutting against the end surface 27a is a flat surface orthogonal to the axis line L. An abutment surface 26a is formed by the wall surface of a step portion positioned at a boundary between the spacer portion 27 and the press-fit portion 28 at the inner peripheral surface of the cylindrical member 26. The abutment surface 26a is configured in a tapered shape along the seating face 14b of the driving shaft 14.

In the cylindrical member 26, the press-fit surface 28a of the press-fit portion 28 is press-fitted and engaged with the press-fit surface 14c of the driving shaft 14, and the abutment surface 26a is pushed along the axis line L of the driving shaft 14 to the position abutting against the seating face 14b. That is, the driving shaft 14 and the cylindrical member 26 are in mutual contact pressing on each other in a predetermined direction (a second direction) perpendicular to the axis line L. After the cylindrical member 26 is press fitted and fixed to the driving shaft 14, the driving shaft 14 and the torque limiter 15 are engaged by means of the threads. Thus, in the cylindrical portion 24 of the torque limiter 15, the end surface 24b is made in contact with pressure to the end surface 27a of the cylindrical member 26; the driving shaft 14 and the torque limiter 15 are fastened and fixed to each other.

That is, the torque limiter 15 is indirectly pushed through the cylindrical member 26 against the seating face 14b of the driving shaft 14 and indirectly press-fitted to engaged with the press-fit surface 14c of the driving shaft 14.

Thus, the power transmission between the torque limiter 15 and the cylindrical member 26 is performed between the end surface 24b of the cylindrical portion 24 and the end surface 27a of the spacer portion 27. Further, the power transmission between the cylindrical member 26 and the driving shaft 14 is performed between the seating face 14b and the abutment surface 26a and also between the press-fit surface 14c and the press-fit surface 28a. In other words, in the driving shaft 14, a torque transmitted from the torque limiter 15 is received and shared by the seating face 14b and the press-fit surface 14c.

Although not shown, a spiral groove or thread is formed on each of the thread surfaces 14a, 24a of the driving shaft 14 and the torque limiter 15 in such a direction that the thread surfaces 14a and 24a are further fastened to each other due to a torque when the power transmission is done. In FIG. 1, a reference numeral 14d depicts a projection for chucking the driving shaft 14 by means of an assembling machine which is employed in a procedure for securing the driving shaft 14 and the torque limiter 15 by means of the threads.

The embodiment configured in the aforesaid manner has the following effects.

(1) In the driving shaft 14, the power transmission between the driving shaft 14 and the torque limiter 15 is shared by the seating face 14b and the press-fit surface 14c. Thus, an amount of transmission torque to be born between the seating face 14b of the driving shaft 14 and the abutment surface 26a of the cylindrical member 26 can be reduced. Therefore, even if a contact area between the seating face 14b and the abutment surface 26a is made smaller, it becomes possible to transmit power between the driving shaft 14 and the torque limiter 15 surely.

In particular, the reduction of the area of the seating face 14b of the driving shaft 14 results in the reduction of the diameter of the driving shaft 14. Further the reduction of the diameter of the driving shaft 14 also results in the miniaturization of the compression mechanism coupled thereto, that is, the miniaturization of the housing 11, so that a small-sized compressor C suitable for an auxiliary machine of the engine E for a vehicle can be provided.

(2) The torque limiter 15 is indirectly press fitted and engaged with the driving shaft 14 through the cylindrical member 26. That is, the cylindrical member 26 to be pressed in and fixed to the driving shaft 14 is provided separately from the torque limiter 15 to be secured to the driving shaft 14 by means of the threads. Thus, the process of pressing the cylindrical member 26 into the driving shaft 14 and the process of engaging the torque limiter 15 with the driving shaft 14 by means of the threads can be performed separately, whereby the assembling procedures of the cylindrical member 26 and the torque limiter 15 with the driving shaft 14 can be performed easily.

Forming only the constituent material of the cylindrical member 26 by high intensity material can suitably treat the press-fit stress acting on the cylindrical member 26. Thus, it is possible to constitute the torque limiter 15 by the low intensity material of a low cost. Further, it is possible to surely perform the fastening and fixing procedure, in other words, the power transmission procedure between the torque limiter 15 and the driving shaft 14.

That is, for example, when such a construction that the torque limiter 15 is directly press-fitted to and engaged with the press-fit surface 14c is employed, it is difficult in the torque limiter 15 to locally constitute a portion near the abutment portion against the press-fit surface 14c by high intensity material. Thus, in the torque limiter 15, in order to increase the intensity of the portion near the press-fit and engagement portion with the press-fit surface 14c, the entirety of the torque limiter 15 is required to be formed by the high intensity material which is expensive, whereby there arises a problem that the manufacturing cost of the torque limiter 15 increases.

(3) In the driving shaft 14, the press-fit surface 14c is made larger in its diameter than that of the thread surface 14a. In the driving shaft 14, the seating face 14b is formed by the wall surface of the step portion positioned at the boundary between the thread surface 14a and the press-fit surface 14c. The seating face 14b is configured in the tapered shape in a manner that the diameter thereof becomes smaller toward the thread surface 14a side. Thus, at the time of pressing the driving shaft 14 into the cylindrical member 26, the press-fit surface 14c of the driving shaft 14 can be press-fitted to and engaged with the press-fit surface 28a of the cylindrical member 26 smoothly without causing galling etc. due to the guide function of the taper-shaped seating face 14b.

Further, for example, as compared with a case where the seating face 14b is formed by a surface orthogonal to the axis line L, a wide area of the seating face 14b can be secured without enlarging the diameter of the driving shaft 14, so that a torque capable of being transmitted between the seating face 14b and the abutment surface 26a having the similar tapered-shape of the cylindrical member 26 can be made larger. Thus, an amount of the transmission torque born by the press-fit portion between the driving shaft 14 and the cylindrical member 26 can be made small, and so it is possible to set the contact area due to the press-fit engagement between the driving shaft 14 and the cylindrical member 26 to a small value. Therefore, the length of the press-fit surface 28a of the cylindrical member 26 along the axis line L can be made short and so the cylindrical member 26 can be miniaturized.

In accordance with another viewpoint, as compared with the case where the seating face 14b is formed by the surface orthogonal to the axis line L, a desired area of the seating face 14b can be secured even if the diameter of the driving shaft 14 is made small. Thus, the aforesaid effect (1) can be attained more effectively.

Further, the taper-shaped seating face 14b can be formed in a desired shape by utilizing a portion near the tip end of a tool (a blade). Thus, the tool is not required to cut so deeply in the driving shaft 14. Therefore, the driving shaft 14 can be processed easily. Further, the diameter of the driving shaft 14 near the boundary between the thread surface 14a and the seating face 14b can be made larger and so the intensity at the portion near the boundary can be increased. That is, for example, when the seating face 14b is formed by the surface orthogonal to the axis line L of the driving shaft 14, the seating face 14b cannot be formed in a desired flat shape depending on the configuration in the vicinity of the curved tip end of the tool. Thus, in this case, it is required to cut the tool deeply into the driving shaft 14 thereby to cope the portion other than the tip end of the tool with the forming portion of the seating face 14b.

(4) The torque limiter 15 is pushed or urged against the taper-shaped seating face 14b of the driving shaft 14 through the cylindrical member 26 provided separately from the torque limiter 15. Thus, the embodiment can also suitably cope with a stress in the outward radial direction acting on the cylindrical member 26 caused by the taper-shape of the seating face 14b by forming only the constituent material of the cylindrical member 26 by high-tension material. Therefore, it is possible to constitute the torque limiter 15 by the low-intensity material of a low cost, and further it is possible to surely perform the fastening and fixing procedure, in other words, the power transmission procedure between the torque limiter 15 and the driving shaft 14.

That is, for example, when such a construction that the torque limiter 15 is directly abutted against the seating face 14b is employed, it is difficult in the torque limiter 15 to locally constitute a portion near the abutment portion against the seating face 14b by the high intensity material. Thus, in the torque limiter 15, in order to increase the intensity of the portion near the abutment portion against the seating face 14b, the entirety of the torque limiter 15 is required to be formed by the high intensity material which is expensive, whereby there arises a problem that the manufacturing cost of the torque limiter 15 increases.

(5) The torque limiter 15 is pushed against the seating face 14b of the driving shaft 14 through the cylindrical member 26 which is provided separately from the torque limiter 15 and also press-fitted to and engaged with the press-fit surface 14c of the driving shaft 14 through the cylindrical member 26. Thus, the assembling procedure of the cylindrical member 26 with the driving shaft 14 can be performed by such a simple procedure of merely pushing the cylindrical member 26 in the driving shaft 14 to such a position that the cylindrical member 26 abuts against the seating face 14b. Therefore, it is possible to eliminate such a troublesome procedure of adjusting the position of the cylindrical member 26 in the driving shaft 14.

(6) The torque limiter 15 is configured in a manner that the transmission of an excessive torque is cut off by breaking parts (the broken portions 25) of the power transmission path of the torque limiter 15. In this case, when the torque limiter 15 is formed by the high intensity material, there may arise a case that the broken portions 25 are not broken satisfactorily even when the transmission torque becomes excessive.

However, as described in the aforesaid sections (2) and (4), in this embodiment, it is not necessary to constitute the torque limiter 15 by the high intensity material and the constituent material of the torque limiter 15 can be selected only in view of the torque limit function. That is, the method of employing the cylindrical member 26 provided separately from the rotation body 15 at the time of performing the fastening and fixing procedure between the driving shaft 14 and the rotation body 15 is particularly an effective fastening method in the case of providing the torque limit function of the broken type to the rotation body 15.

The Second Preferred Embodiment

Figure 3:
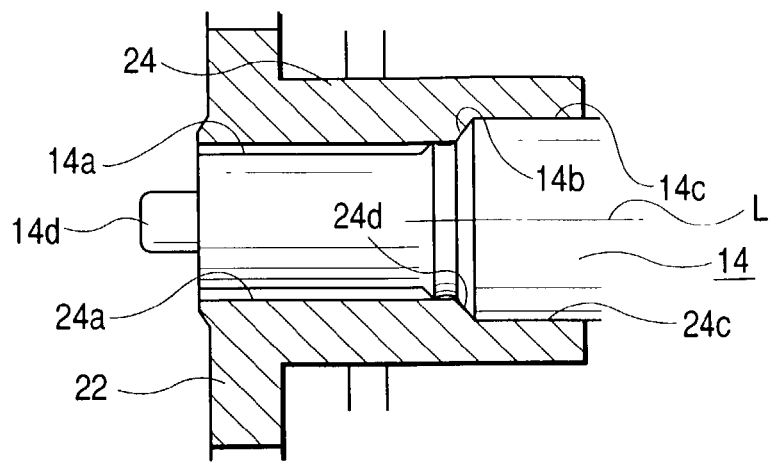
FIG. 3 is an enlarged sectional view of a main portion showing the fastening structure according to the second embodiment.

As shown in FIG. 3, the second embodiment is arranged in a manner that a cylindrical member 26 is eliminated from the first embodiment. A torque limiter 15 is arranged in a manner that a cylindrical portion 24 is extended in the direction along the axis line L so that the torque limiter 15 is directly pushed or urged against the seating face 14b of a driving shaft 14 and also directly press-fitted to and engaged with the press-fit surface 14c of the driving shaft 14 by means of the cylindrical portion 24.

That is, on the inner peripheral surface of the cylindrical portion 24, a press-fit surface 24c on the torque limiter 15 is provided on the right side in the figure adjacent to a thread surface 24a in a manner that the diameter thereof is made larger than that of the thread surface 24a. On the inner peripheral surface of the cylindrical portion 24, an abutment surface 24d is formed by a step portion which is positioned at a boundary between the thread surface 24a and a press-fit surface 24c. The abutment surface 24d is configured in a tapered shape along the seating face 14b of the driving shaft 14.

Thus, at the time of assembling, due to the relative movement of the driving shaft 14 and the torque limiter 15 in the axis line L direction during the screwing-engagement procedure between the driving shaft 14 and the torque limiter 15 through the thread surfaces 14a, 24a, the cylindrical portion 24 is gradually going to be pushed or urged against the seating face 14b by means of the abutment surface 24d and simultaneously the press-fit surface 14c and the press-fit surface 24c are pushed in, press-fitted to and engaged with each other while being relatively rotated.

Thus, the driving shaft 14 and the torque limiter 15 are fastened and fixed to each other so as to be able to transmit the power between the seating face 14b and the abutment surface 24d and also between the press-fit surface 14c and the press-fit surface 24c. That is, each of the seating face 14b, the press-fit surface 14c and the press-fit surface 14c of the driving shaft 14 and the abutment surface 24d and the press-fit surface 24c of the cylindrical portion 24 serves as a power transmission surface between the driving shaft 14 and the torque limiter 15.

This embodiment can attain the effects similar to the effects (1) and (3) of the aforesaid first embodiment. Further, this embodiment can attain the following additional effects.

(1) The torque limiter 15 is provided with the cylindrical potion 24 and the torque limiter 15 is directly press-fitted to and engaged with the driving shaft 14 by means of the cylindrical potion 24. Thus, for example, the embodiment can reduce the number of parts as compared with the case where a cylindrical member provided separately from the torque limiter 15 is employed at the time of performing the press-fit and engagement procedure between the driving shaft 14 and the torque limiter 15.

(2) In the torque limiter 15, the thread surface 24a to be engaged with the driving shaft 14 and the press-fit surface 24c to be pressed into the driving shaft 14 are formed on the inner peripheral surface of the cylindrical portion 24. Thus, for example, as compared with a case where a cylindrical portion for the thread surface 24a and a cylindrical portion for the press-fit surface 24c are provided separately, (such a modification is also within the scope of the invention), the configuration of the torque limiter 15 can be made simple and so the torque limiter 15 can be manufactured easily. Further, the screwing engagement procedure between the driving shaft 14 and the torque limiter 15 and the press-fit procedure between the driving shaft 14 and the torque limiter 15 can be performed simultaneously, whereby it becomes possible to perform the fastening and fixing procedure between the driving shaft 14 and the torque limiter 15 in a short time.

The following modifications may be made in the invention without departing from the spirit of the invention.

Figure 4:
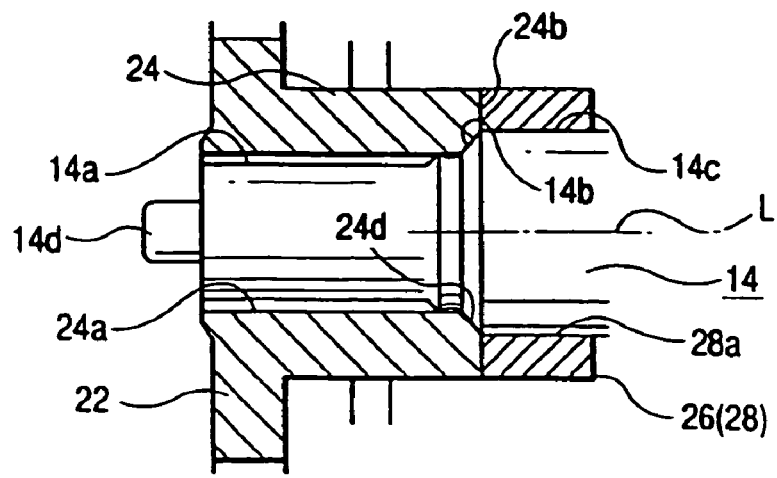
FIG. 4 is an enlarged sectional view of a main portion showing the fastening structure according to another example.

As shown in FIG. 4, the first embodiment may be changed in a manner that the abutment surface 24d is provided on the torque limiter 15 (the cylindrical portion 24) and so only the press-fit portion 28 (the press-fit surface 28a) is provided on the cylindrical member 26.

Figure 5:
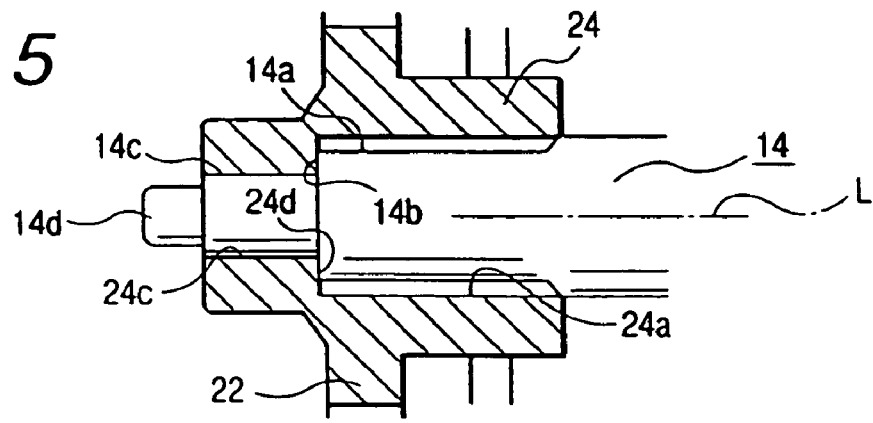
FIG. 5 is an enlarged sectional view of a main portion showing the fastening structure according to still another example.
Figure 6:
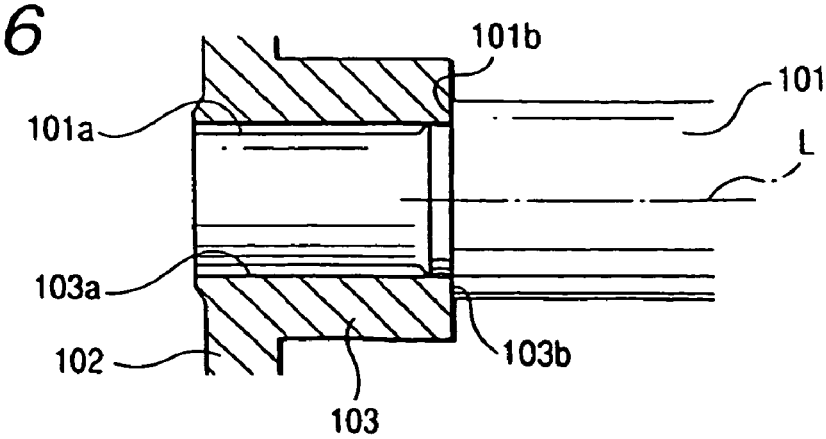
FIG. 6 is an enlarged sectional view of a main portion showing the conventional fastening structure.

As shown in FIG. 5, the second embodiment may be changed in a manner that the positional relation at the forward and rear positions along the axis line L between the thread surfaces 14a, 24a and the press-fit surfaces 14c, 24c is reversed. In this case, in view of the assembling property, like the modification shown in the figure, the diameters of the press-fit surfaces 14c, 24c are preferably set to be smaller than those of the thread surfaces 14a, 24a . That is, for example, if the diameters of the press-fit surfaces 14c, 24c are set to be larger than those of the thread surfaces 14a, 24a, at the time of fastening and fixing the torque limiter 15 to the driving shaft 14, it is required to fit the torque limiter 15 from the not-shown right end side of the driving shaft 14 and so such a procedure is troublesome.

Incidentally, in the modification shown in FIG. 5, each of the seating face 14b of the driving shaft 14 and the abutment surface 24d of the torque limiter 15 (the cylindrical portion 24) is formed by a flat surface orthogonal to the axis line L. That is, the invention can be realized even in such a modification that the seating face 14b is formed by the flat surface orthogonal to the axis line L.

The second embodiment may be changed in a manner that the torque limiter 15 (the cylindrical portion 24) is pushed indirectly against the seating face 14b of the driving shaft 14. That is, for example, a cylindrical spacer is disposed within the cylindrical portion 24 in a manner that the cylindrical portion 24 is made abut against the seating face 14b through the spacer.

The rotation body is not limited to one having the torque limit function but maybe one having the configuration of merely performing the power transmission. That is, for example, the embodiment of FIG. 1 may be modified in a manner that the rotor 12 is directly fixed to the driving shaft 14 and the fastening structure of the invention is employed for performing the fixing operation between the rotor 12 as the rotation body and the driving shaft 14 as the shaft.

The power transmission path to which the fastening structure of the invention can be applied is not limited to a position between the engine E and the compressor C in the air conditioner for a vehicle, but, for example, maybe a position between the engine E and an oil pressure pump for a brake assist apparatus for a vehicle, or a position between the engine E and an oil pressure pump for a power steering apparatus, or a position between the engine E and an air pump for an air suspension apparatus. That is, as the fluid machine, there can be raised oil pressure pumps and air pumps etc. for various kinds of usage in addition to the refrigerant compressor.

In a case where the shaft is the output shaft of the driving source of an engine etc. and the rotation body is a pulley etc. fastened and fixed to the output shaft, the invention may be materialized to the fastening structure for the shaft and the rotation body.

The technical concept of the invention capable of being grasped from the aforesaid embodiment will be described.

(1) The fastening structure for power transmission members is arranged in a manner that the rotation body is directly pushed or urged against the seating face of the shaft through the screwing-engagement with shaft.

(2) The fastening structure for power transmission members is arranged in a manner that the fluid machine is a compressor constituting a refrigerating cycle and the compressor compresses refrigerant gas through the rotation of a driving shaft rotatably supported at the housing of the compressor.

(3) The power transmission mechanism is arranged in a manner that the shaft and the rotation body and to be fastened and that the shaft and the rotation body are fastened and fixed to each other by means of the fastening structure described in the aforesaid item (1) or (2).

(4) The fluid mechanism is arranged to be provided with the power transmission mechanism described in the aforesaid item (3).

According to the invention configured in the aforesaid manner, the power transmission between the shaft and the rotation body is shared by the seating face to which the rotation body is pushed or urged and the portion which the rotation body is press-fitted to and engaged with. Thus, an amount of the transmission torque to be born by the seating face can be made small. Therefore, it becomes possible to surely perform the power transmission between the shaft and the rotation body without increasing the area of the seating face. The reduction of the area of the seating face results in the reduction of the diameter of the shaft.

What is claimed is:

1. A power transmission device comprising:
   a shaft capable of rotating around an axis; and
   a rotation body press-fitted and fixed to the shaft in a direction parallel to the axis of the shaft to rotate along with the shaft;
   wherein the rotation body comprises a main body and a homogenous one-piece cylindrical member, wherein a drive source is connected with the main body,
   wherein a press-fit surface of the shaft and the rotation body are in mutual contact,
   wherein a press-fit surface of the cylindrical member that is an inner peripheral surface of the cylindrical member exerting a press-fit force on a press-fit surface of the shaft in a direction perpendicular to the axis of the shaft, the press-fit surface of the shaft being parallel to the axis of the shaft,
   the shaft has a tapered seating face,
   the cylindrical member is press-fitted to the seating face in the direction parallel to the axis of the shaft,
   the shaft has a thread surface,
   the main body has a thread surface,
   the thread surface of the shaft being screw-engaged with the thread surface of the main body,
   the main body and the cylindrical member are abutting on each other at their end surfaces in the direction parallel to the axis of the shaft,
   the seating face is disposed between the press-fit surface and the thread surface of the shaft.

2. The power transmission device according to claim 1, wherein the cylindrical member is disposed between the end surface of the main body and the seating face.

3. The power transmission device according to claim 2, wherein the cylindrical member has a higher intensity than the main body.

4. The power transmission device according to claim 2, wherein the cylindrical member includes:
   an end surface of the cylindrical member press-fitted to the main body, wherein the end surface of the cylindrical member abutting on the end surface of the main body in the direction parallel to the axis of the shaft;
   an abutment surface abutting on the seating face of the shaft; and
   the press-fit surface of the cylindrical member press-fitted to the press-fit surface of the shaft the press-fit surface of the cylindrical member being parallel to the axis of the shaft,
   wherein the inner peripheral surface of the cylindrical member comprises the abutment surface and the press-fit surface of the cylindrical member.

5. The power transmission device according to claim 2, wherein
   the shaft has the seating face abutting on the cylindrical member in the direction parallel to the axis of the shaft; and
   the abutment surface of the cylindrical member abutting on the seating face of the shaft is disposed between the end surfaces of the main body and the cylindrical member abutting on each other and the seating face of the shaft.

6. The power transmission device according to claim 2, wherein the seating face is positioned at a boundary between the thread surface of the shaft and the press-fit surface of the shaft, and
   wherein the thread surface of the shaft, the seating face, and the press-fit surface of the shaft are provided in this order from an end portion of the shaft.

7. The power transmission device according to claim 1, wherein a part of the rotation body breaks when more than a predetermined amount of torque is acted.

8. The power transmission device according to claim 1, wherein the seating face is formed in a tapered shape so that a diameter thereof is reduced toward the thread surface.

9. The power transmission device according to claim 1, further comprising a driving source for providing a rotation force.

10. The power transmission device according to claim 1, wherein the press-fit surface of the shaft is larger in diameter than the thread surface.

11. The power transmission device according to claim 1, wherein the main body comprises a cylindrical portion, and
    wherein the cylindrical portion includes:
    the end surface of the main body; and
    the thread surface of the main body.

* * * * *